(12) United States Patent
Borror et al.

(10) Patent No.: US 7,587,771 B2
(45) Date of Patent: *Sep. 15, 2009

(54) TEXTURED PET BLANKET

(76) Inventors: Regina Borror, 1458 Hollenbeck Ave., Sunnyvale, CA (US) 94087; Samantha Borror, 1458 Hollenbeck Ave., Sunnyvale, CA (US) 94087; Joan Blumreich, 317 E. 18th St., Kaukauna, WI (US) 54130

( * ) Notice: Subject to any disclaimer, the term of this patent is extended or adjusted under 35 U.S.C. 154(b) by 25 days.

This patent is subject to a terminal disclaimer.

(21) Appl. No.: 11/969,160

(22) Filed: Jan. 3, 2008

(65) Prior Publication Data

US 2008/0098523 A1  May 1, 2008

Related U.S. Application Data

(63) Continuation of application No. 11/683,186, filed on Mar. 7, 2007, now Pat. No. 7,363,667.

(60) Provisional application No. 60/874,160, filed on Dec. 12, 2006, provisional application No. 60/796,091, filed on May 1, 2006.

(51) Int. Cl.
*A47G 9/06* (2006.01)
*A01K 1/015* (2006.01)

(52) U.S. Cl. ................. 5/652; 5/420; 5/655.9; 5/953; 119/28.5

(58) Field of Classification Search ......... 5/652, 5/657, 636, 640, 490, 655.9, 953, 653, 417, 5/420, 655, 690, 737, 738, 740; 119/28.5, 119/702, 707; 446/183; D6/595, 596, 601–603
See application file for complete search history.

(56) References Cited

U.S. PATENT DOCUMENTS

| | | | |
|---|---|---|---|
| 5,363,804 A | 11/1994 | McAlister | |
| 5,546,620 A | 8/1996 | Matthews | |
| D419,357 S * | 1/2000 | Atkinson | D6/603 |
| 6,427,265 B1 | 8/2002 | Dix | |
| D479,938 S * | 9/2003 | Quirk et al. | D6/603 |
| 6,684,422 B2 | 2/2004 | LeFevre et al. | |
| 7,363,667 B2 * | 4/2008 | Borror et al. | 5/652 |
| 2004/0088789 A1 | 5/2004 | Mitchell | |
| 2004/0237899 A1 | 12/2004 | Fung | |
| 2005/0210591 A1 | 9/2005 | Mead et al. | |
| 2005/0278856 A1 | 12/2005 | Welch | |
| 2007/0251013 A1 * | 11/2007 | Borror et al. | 5/652 |
| 2008/0098523 A1 * | 5/2008 | Borror et al. | 5/420 |

* cited by examiner

*Primary Examiner*—Robert G Santos
(74) *Attorney, Agent, or Firm*—Advantia Law Group; Michael W. Starkweather; Jason P. Webb

(57) ABSTRACT

A multi-purpose textured pad. There is: a first flexible planar member, second flexible planar member; a first compressible padding material; a second compressible padding material; an array of elongated texture devices disposed in a layer above the top surface of the first flexible planar member, each including: a plurality of elongated texture members, an elongated base member and a plurality of flexible strips; and two pairs of fastening mechanisms. The second flexible planar member is coupled to the first flexible planar member at a plurality of edges. The first compressible padding material supports a user. The second compressible padding material generates an audible sound when compressed. The base member extends along the first flexible planar member. The elongated texture devices provide density and thickness to a top surface of the first flexible planar member. The fastening mechanisms secure the planar members in a folded mode.

11 Claims, 4 Drawing Sheets

TEXTURED PET BLANKET

CROSS-REFERENCE TO RELATED APPLICATIONS

This application is a continuation of, under 37 CFR 153(b), and claims priority to, under 35 U.S.C. § 120, to the U.S. Non-Provisional application Ser. No. 11/683,186 by Borror et al. This application thereby claims priority, under 35 U.S.C. § 120, to the U.S. Provisional Patent Application No. 60/796,091 to Jaon Blumreich, Jaye Schultz, and Regina Borror filed on May 1, 2006, and U.S. Provisional Patent Application No. 60/874,160 to Regina Borror filed on Dec. 12, 2006, which are incorporated by reference herein.

BACKGROUND OF THE INVENTION

1. Field of the Invention

The present invention relates to cushioning devices and pads, specifically a multi-purpose textured pad for providing comfort to a user.

2. Description of the Related Art

There are many instances when individuals are forced to spend an extended time resting or sitting in hardened chairs, beds or the like. A prime example of such occurs an individual is resting, sleeping, or traveling. When resting one's body against a hardened surface, weight distribution of the body applies a downward force against a hardened surface, thereby subjecting the body to constant pressure and discomfort. This is particularly a problem with heavy weight individuals. Individuals experiencing such prolonged discomfort may risk of injuring themselves. For example, individuals may risk incurring tissue damage, and ultimately the development of ulcers, at those points on the body, applying force against a hardened surface for a long period of time. Ulcers expose an individual to the risks of infection and irreversible tissue damage, and in any case are difficult to treat.

The body discomfort and potential medication complications associated prolonged resting, sitting, sleeping, etc. on hardened surfaces may extend to an individual's pet as well. Many people own pets, subject to prolonged contact with hardened concrete and floor surfaces, that suffer from hip and elbow dysplasia, leg injuries, skin disorders, etc., causing expensive veterinarian bills. What is needed is a universal, portable soft cushion or pad that may be employed by and individuals, children, and pets while sitting, resting, traveling, and engaging in other activities that require prolonged contact with hardened surfaces. Some improvements have been made in the field.

U.S. Pat. No. 5,363,804, issued to McAlister, discloses a cushion for a pet, preferably a cat, comprising a pad of a plurality of layers of raw unwoven polyester. Each layer comprises a solid first fiber and a second fiber that has a core and a sheath surrounding the core. The sheath has a lower melting temperature than the core. The pad is then heated to the temperature, where the sheath of the second fiber melts and sticks to the adjacent fiber, whether a first or a second fiber, and then cooled until the second fiber solidifies, attached to the adjacent fiber. The resulting material is a matted web of layered fibers that is subsequently cut into a pad of suitable size, such as large enough to accommodate a sleeping cat. The edge of the pad is bound by sewing or heat treatment.

U.S. Pat. No. 6,427,265, issued to Dix, discloses an interactive security blanket for children comprises two fabric sheets sewn together to provide a blanket body. One of the sheets preferably has a colorful children's pattern or design, while the other is provided in a complimentary solid color. Additionally, a plurality of spaced-apart ribbon loops, or "tags," are attached to the four edges of the blanket body, and extend out therefrom. The lengths of ribbon comprising the tags are looped from and back into the seam between the pieces of fleece, and are firmly attached at that seam. The tags are provided in a variety of colors, patterns, and textures, e.g., they may be wide, thin, silky, textured, bright-colored, pastel, shiny, solid, and/or provided with fabric prints suitable for children. The tags function as a means for providing sensory stimulation for children via the children's passive (ocular) or active (tactile) interaction with the pillow or blanket.

U.S. Pat. No. 6,684,422, issued to LeFevre, et al., discloses an interactive infant or child blanket with a tactile apparatus for removably attaching small toys such as pacifiers, teethers, rattles, and developmental toys. The invention also includes an apparatus for removably attaching the blanket itself to other objects such as a highchairs, baby bouncers, infant swings, car seats, strollers, or shopping carts, for play control and stability. The novel attachment system allows a child to play on the go without the hassle of dropping or soiling play objects, thereby minimizing the chance of loss or exposure to germs. The blanket preferably comes packaged in a matching bag that can also carry toy attachments and perhaps a bottle and/or diapers, providing parents with a small "baby to-go" bag for quick errands and trips. In another embodiment, the retention blanket includes a blanket adapted to engage a wheelchair as required by elderly and handicap persons.

U.S. Pat. No. 5,546,620, issued to Matthews, discloses a multifunctional baby device including a substantially toroidal shaped cushion having at least one strap for preferably removably securing a play toy to the device. The device may also include a mat integrally interconnected with the cushion for providing a clean, soft surface. This mat may define an interior portion of the cushion and may also extend beyond to cushion to provide a suitable surface for diaper changing. A baby may be placed in the cushion in a supine position whereupon the cushion provides support to the baby's head, or in a prone position whereupon the cushion provides support to the baby's chest. Preferably, the toys are interconnected with the support such that they are accessible only when the baby is in the noted prone position.

U.S. Patent Application No.: 2004/0088789, issued to Mitchell, discloses a multi-purpose mat has open and folded configurations. The mat includes a base and a plurality of sidewalls disposed about a periphery of the base. A first resilient flexible slat is disposed within one of the sidewalls and a second resilient flexible slat is disposed within the remaining sidewalls. The slats provide means for reinforcing the sidewalls and also provide a spring-like effect that allows the mat to automatically rollout into the open configuration from the folded configuration. The sidewalls fold about the periphery of the base; the sidewalls moving from a position generally adjacent to the base to a position generally perpendicular to and extending generally upwardly from the base when the mat is moved from the folded configuration to the open configuration.

U.S. Patent Application No.: 2005/0278856, issued to Welch, discloses a diaper changing article comprising a flat circular body preferably having a plurality of fold lines therein, wherein the body is adapted to be folded about the fold lines to open and close the changing article; preferably, a storage area radially arranged about a center of the circular body, wherein at least one pocket in the storage area has an opening proximal to the center of the circular body; and at least one handle coupled to the outer edge, wherein a handle is adapted to carry the body is exposed in the closed state and a second handle is adapted to maintain the body in the closed state. In one embodiment, the handle is adjustable in length. In one embodiment, the article is wearable by the user and is expandable to hold additional items. A detachable fabric container is disclosed, whereby the container preferably holds wipes or such. The diaper changing article preferably has a polygonal shape, such as a square, when folded closed.

U.S. Patent Application No.: 2005/0210591, issued to Mead et al., discloses a support pillow comprises a cushion body having a medial region and two opposing arms that define a generally open well, with the cushion body having an outer periphery and an inner periphery adjacent the well. An adjustable suspension system is used to suspend one or more objects above the pillow.

U.S. Patent Application No.: 2004/0237899, issued to Fung, discloses a chew-resistant pet bed is disclosed comprising a mattress, a plurality of rims, and a plurality of spherical joints. The mattress comprises a plurality of insert sections. The components of the pet bed are preferably configured to be integrally molded and comprise a chew-resistant homogeneous resilient non-toxic bitter material. In alternative embodiments, the components of the pet bed are configured to detachably couple to one another and comprise a chew-resistant homogeneous resilient non-toxic bitter material. Preferably, the chew-resistant pet bed ranges in size such that the pet bed will fit within 24-54 inch deep dog shipping crates. Preferably, at least one of the plurality of insert sections comprise cloth; in other embodiments, at least one of the plurality of insert sections comprise a chew-resistant non-toxic non-bitter material pet toy, a plurality of bristles, or a combination thereof.

The inventions heretofore known suffer from a number of disadvantages which include: being expensive; having material lacking sufficient density and thickness to provide a comfortable experience for a user; lacking a source of entertainment; limited in applicability; and/or difficult to manufacture.

What is needed is a multi-purpose textured pad that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available cushioning devices and pads. Accordingly, the present invention has been developed to provide a multipurpose textured pad for providing comfort and entertainment to a user.

In one embodiment of the present invention, there is a multi-purpose textured pad for providing comfort to a user. The pad includes: a first flexible planar member; a second flexible planar member that may be substantially and stitchedly coupled to the first planar member at a plurality of edges; a first compressible padding material disposed in an interior that may be formed between a bottom side of the first flexible planar member and a top side of the second flexible planar member, and may be configured to provide support to a portion of a user's body; and a second compressible padding material disposed in an aperture that may be bounded in the first compressible padding material, and configured to generate an audible sound when compressed.

In another embodiment of the present invention, there may be an array of elongated texture devices that may be disposed in a layer above the top surface of the first flexible planar member, wherein each texture device, includes: a plurality of elongated texture members, each including: an elongated base member that may be medially coupled to, and extending along the first flexible planar member; and/or a plurality of flexible strips that may extend outwardly from, and/or may be substantially orthogonal to the base member, wherein the plurality of flexible strips may be medially and/or stitchedly coupled to a top surface of the first planar member, in an array, and may be configured to provide density and thickness to soften the top surface of the first flexible planar member.

In yet another embodiment of the present invention, the pad may further comprise a plurality of flexible fastening members that may be medially coupled to the first planar member and/or second planar member, and may form two pairs of fastening mechanisms near an end of the first planar member and/or second planar member; and/or may be configured to secure the first planar member and/or second planar member in a folded mode.

In still yet a further embodiment of the present invention, the first flexible planar member, second flexible planar member, elongated texture devices, first flexible fastening member, and/or the second fastening member may comprise substantially soft fleece material.

Further, it may be that the first compressible padding material comprises a foam pad, and/or the second compressible padding material may comprise a squeaky toy, according to one embodiment of the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

Figure 1:
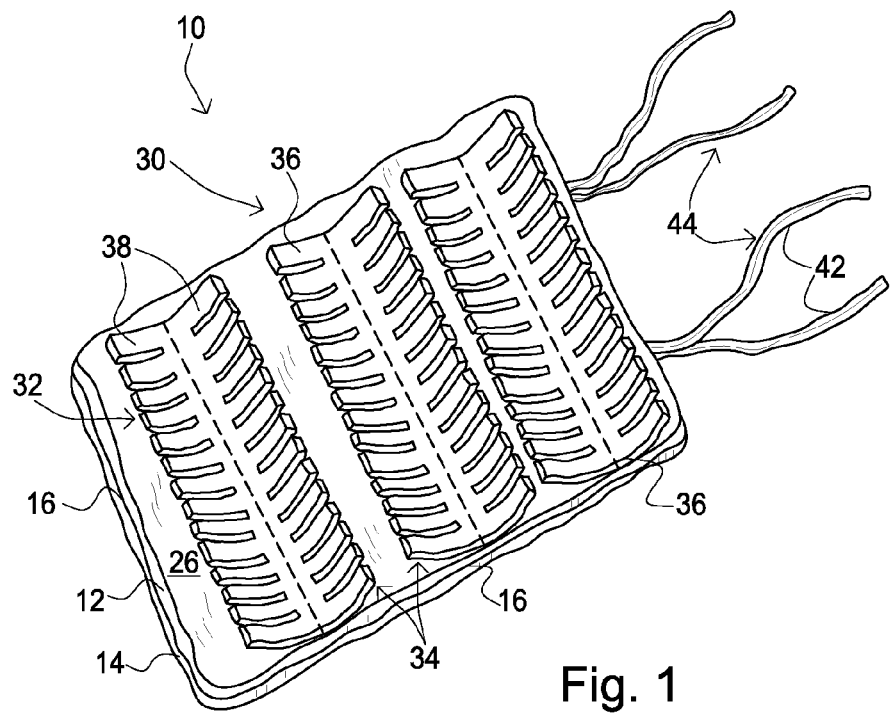
FIG. 1 is a top perspective view of a multi-purpose textured pad, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 2:
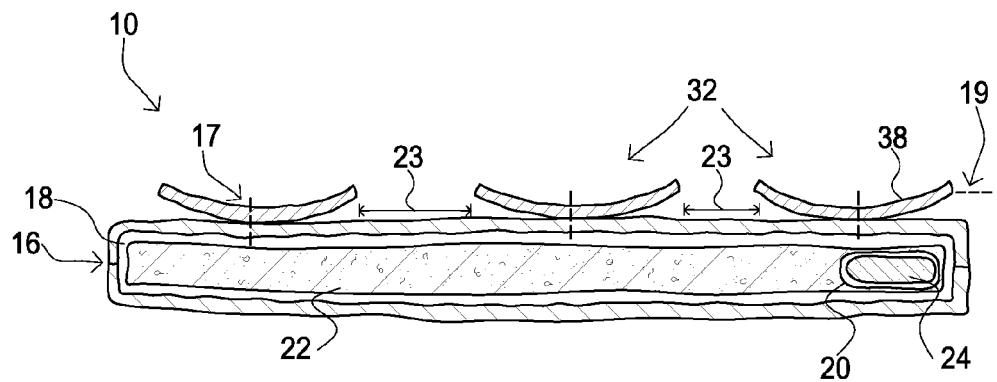
FIG. 2 is a sectional view of a multi-purpose textured pad, according to one embodiment of the invention.
Figure 3:
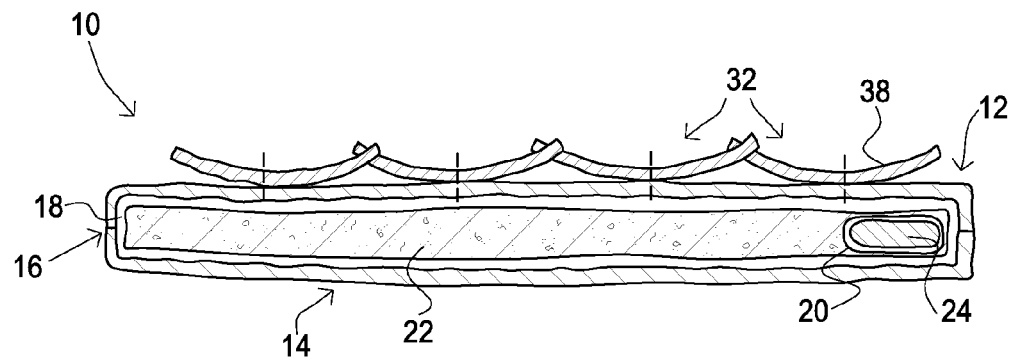
FIG. 3 is a sectional view of a multi-purpose textured pad, according to one embodiment of the invention.
Figure 4:
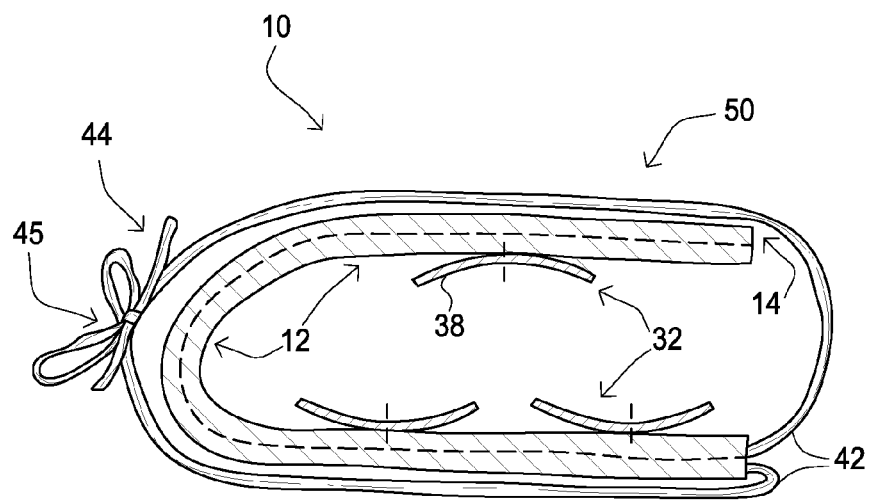
FIG. 4 is a sectional view of a multi-purpose textured pad, according to one embodiment of the invention.

FIGS. 1-7 illustrate an embodiment of a multi-purpose textured pad 10 for providing comfort and entertainment to a user resting thereon. As shown, the pad includes: a first flexible planar member 12; a second flexible planar member 14 stitchedly coupled to the first planar member at a plurality of edges 16 by means of sewing thread 17, as shown in FIGS. 2, 3, and 4. The planar members 12, 14 are coupled to each other such that an interior 18 is formed between a bottom side of the first flexible planar member 12 and a top side of the second flexible planar member 14, and configured to receive a first compressible padding material 22 therein. In one embodiment shown in FIGS. 2 and 3, the first compressible padding material 22 is a filler material as commercially on sale at DogBedWorks, Inc., 8 Omaha Avenue, Northboro, Mass. 01532, adapted to comfortably support a user or a pet resting thereon. In other embodiments, non-limiting examples of the first compressible padding material (also referred to as filler material) may include, but is not limited to: cloth padding, cotton padding, fabric padding, foam, memory foam, batting, cotton, etc.

According to one embodiment of the invention, there is a second compressible padding material 24 disposed in an aperture 20 bounded by the first compressible padding material 22, and configured to generate an audible sound when compressed. In one embodiment shown in FIGS. 2 and 3, the second compressible padding material 24 is a squeaky toy, which may comprise a toy from a group of miniature plush toys described in U.S. Pat. No. 6,685,532, issued to McClean, and U.S. Pat. No. 7,144,293, issued to Mann et al., which are incorporated by reference herein. In other embodiments, the toy may comprise a plurality of squeaky toys commercially on sale worldwide at Target, Inc. stores. The second compressible padding material 18 is configured to generate an audible sound with a purpose of providing a source of entertainment to a user whenever the user's body coincidentally compresses such while resting, seating, playing, or moving on the pad 10.

In another embodiment of the present invention shown in FIG. 1, there is be an array 30 of elongated texture devices 32 disposed in a layer 19 on a top surface 26 of the first flexible planar member 12, as shown in FIG. 2, wherein each texture device, includes: a plurality of elongated texture members 34, each including: an elongated base member 36 medially coupled to, and extending along the first flexible planar member 12; and a plurality of flexible strips 38 extending outwardly from, and substantially orthogonal to the base member 36, wherein the flexible strips 38 are medially and stitchedly coupled to the top surface 26 of the first planar member 12. The layer 19 of elongated texture devices 32 are configured to provide sufficient density and thickness to soften a top surface 26 of the first flexible planar member 12, thereby providing means of comforting a user resting thereon.

Figure 7:
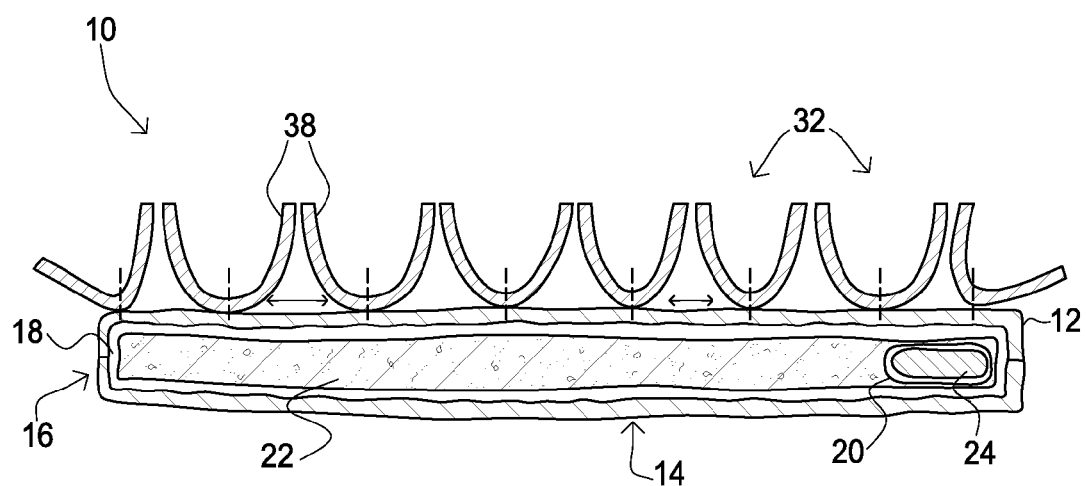
FIG. 7 is a sectional view of a multi-purpose textured pad, according to one embodiment of the invention.

According to one embodiment of the invention as shown in FIG. 7, one elongated texture device 32 may be stitchedly coupled to the top surface 26 of the first flexible planar member 12 at an interval 23 from another elongated texture device 32. It may be that the ratio of a length of the elongated texture member 34 to the length of the interval 23 between devices 32 may be large enough such that the devices 32 may substantially contact one another in an erect position that is orthogonal to the top surface 26 of the first flexible planar member 12 so as to increase the apparent density of devices 32 in order to further soften the top surface 26 of the pad 10. It is envisioned that one skilled in the art may appreciate that the interval 23 between elongated textured devices may vary in length, according to alternative embodiments, wherein the pad 10 still performs its intended function of providing comfort to a user.

Other embodiments of the present inventive pad 10 may include a plurality of layers 19 of elongated texture devices 32 coupled to its top surface 26, wherein the layers 19 may be vertically stacked on top of each other as a means to provide additional density and thickness to further soften the top surface 26 of the pad 10. For example, some embodiments of the pad 10 may include be two layers of elongated texture devices 32; other embodiments of the pad 10 may include three layers of elongated texture devices 32; yet more embodiments of the pad 10 may include five layers of elongated texture devices 32, and so forth.

Figure 6:
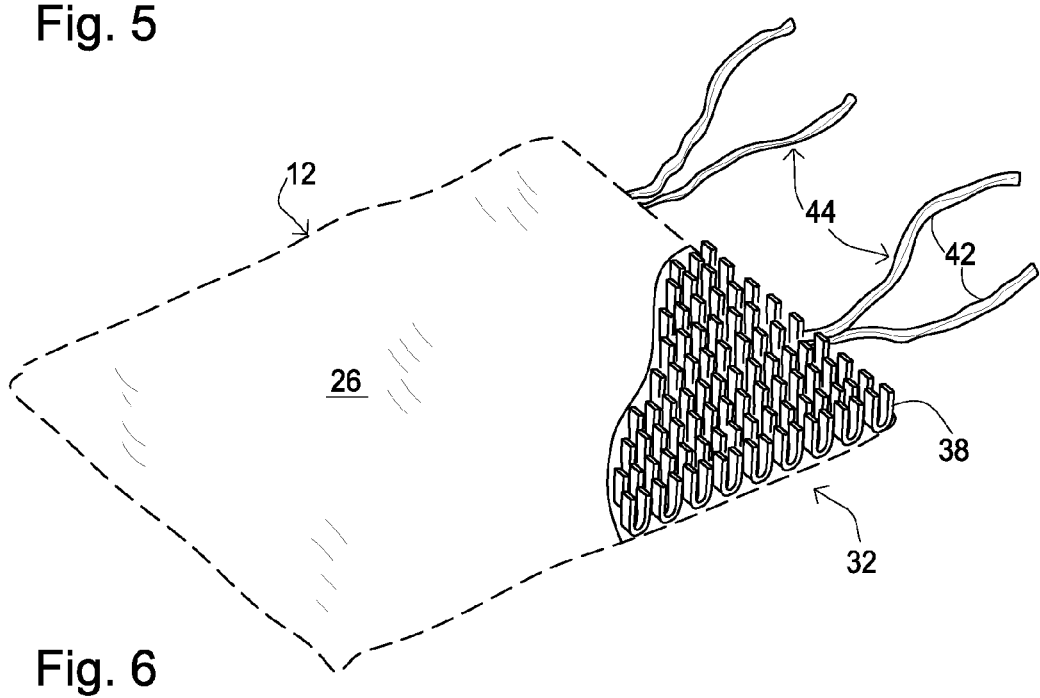
FIG. 6 is a top plan view of a multi-purpose textured pad, according to one embodiment of the invention.

In yet another embodiment of the present invention as shown in FIGS. 1, 4 and 6, the pad 10 further comprises a plurality of fastening members 42 medially coupled to the flexible planar members 12, 14, forming a pair of fastening mechanisms 44 extending outwardly therefrom. As shown in FIG. 4, the fastening mechanisms 44, serve to secure planar members 12, 14 in a folded mode 50, thereby enabling a user to transport the pad 10 from one location to another such as when traveling on vacations, business trips, etc.

Additionally, according to one embodiment, a user may employ the fastening members 42 to removably couple the pad 10 to a chair or another object by tying a knot 45 as a means to employ the pad 10 as a cushioning device to experience a comforting sensation while sitting on the pad 10. Further, when the pad 10 is not in use, a user may place such in the folded mode 50 to prevent the elongated texture devices 32, and the top surface of the first planar member 12 from collecting dust and foreign particles, or otherwise getting excessively dirty, thereby extending the life of the pad 10.

In still yet a further embodiment of the present invention, the planar members 12, 14; elongated texture devices 32; and fastening mechanisms 44 comprise substantially soft fleece material, such as available in the commercial marketplace at Fashion Fabrics Club, 10490 Baur Blvd. St. Louis, Mo. 63132. The fleece material serves a substantially soft surface to provide comfort to a user resting thereon. One skilled in the art may appreciate that other embodiments of the planar members 12, 14; elongated texture devices 32; and the fastening mechanisms 44 may comprise other substantially soft material such as fabric, cotton, linen, etc. as a means to provide comfort to a user.

In operation of the illustrated embodiment, a human being or domestic pet may employ the textured pad 10 for multi-purposes which may include, but is not limited to: achieving a comfortable resting experience, having a source of entertainment, etc. Users may rest their bodies on the elongated texture devices 32, wherein the texture devices provide sufficient density and thickness to the top surface 26 of the first flexible planar member 12, enabling the user to comfortably rest thereon. Additionally, children and pets may employ the pad 10 as a source of entertainment by using their weight bodies to apply a downward force on the pad 10, thereby compressing the compressible padding members 22, 24 and causing the second compressible padding member 24 to generate an audible sound effect.

Additionally, in operation, it may be that a user may manipulate the elongated texture devices 32 with his or her hands such that the elongated texture members 34, the elongated base members, and strips 38 may either: overlap one another as shown in FIG. 4; be positioned orthogonal to the top surface 26 of the pad 10 as shown in FIG. 7; and/or lay substantially flat on the top surface 26 of the pad 10 as shown in FIGS. 1, 2, 3, 4, 5, and 6, and still experience the desired effect of employing the pad 10.

Moreover, in operation, when not in use or when transporting the pad 10 from one location to another, such as when traveling, a user may place the pad 10 in the folded mode 50 and couple the fastening members 42 together by tying a knot 45, as shown in FIG. 4, thereby retaining the pad 10 in the folded mode 50.

Further, in operation, a user may couple the fastening members 42 to a chair, stool, etc. as a means to employ the pad 10 as a cushioning device when sitting thereon.

Embodiments of the multi-purpose textured pad 10 fulfill a need for a portable cushioning device that may be employed by both human beings and domestic animals owned as pets for multi-purposes that may include, but is not limited to: a seat cushions; a pillow; a pet bed; a play and resting mat for children at childcare centers/homes; a decorative bed quilt, etc. The multi-purpose pad 10 enables human beings and pets to sit or rest thereon and enjoy a comforting experience. Further, the pad 10 may be utilized to provide a source of entertainment for pets and/or child by compressing the padding materials 22, 24 to generate sound effects. In other embodiments, the pad 10 may function as a hair magnet for pets that are attracted to the pad such that lose hair on other surfaces in a structure is minimized.

Figure 5:
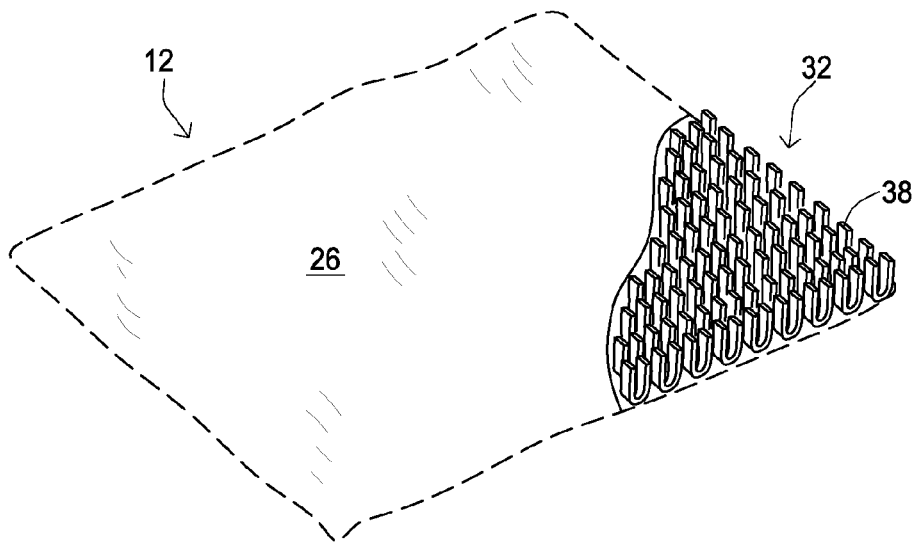
FIG. 5 is a top plan view of a multi-purpose textured pad, according to one embodiment of the invention.

Although FIGS. 1, 5 and 6 illustrate rectangular-shaped embodiments of the pad 10, one skilled in the art of designing/manufacturing texture pads may appreciate that the pad 10 may be shaped differently, according to other embodiments. For example, square, elliptical, triangular, circular, etc.

Additionally, although FIGS. 1, 2, 3, 4 and 7 illustrate one layer 19 of elongated texture devices 32, disposed in an array 30 on the top surface 26 of the first flexible planar member 12, there may be many layers of elongated texture devices 32, wherein the layers may be vertically stacked on top of each other, wherein one skilled in the art of designing/manufacturing texture pads 10 may appreciate that the pad 10 may still provide sufficient density and thickness in order to soften the top surface 26 of the first flexible planar member 12 so as to provide comfort to a user resting thereon, according to various embodiments of the invention.

Moreover, although FIGS. 1, 5, and 6 illustrate rectangular-shaped embodiments of the pad 10, one skilled in the art of designing/manufacturing pads may appreciate that the pad 10 may be shaped differently. For example, square, elliptical, triangular, circular, hexagonal, octagonal, etc.

Further, it is envisioned that one skilled in the art would understand that the dimensions of the pad 10 may vary according to various embodiments, wherein the number of elongated texture devices 32, elongated texture members 34, and strips 38 may vary accordingly. For example, one embodiment of the pad 10 may be 17 inches in length by 17 inches in width; another embodiment of the pad 10 may be 19 inches in length by 19 inches in width, and so forth.

More, it is also envisioned that there may be an even or odd number of elongated textured devices 32 and/or strips 38 disposed on the top surface 26 of the pad 10, according to other embodiments. Also, the intervals 23 between the elongated texture devices 32 may be symmetrical or asymmetrical in length, according to alternative embodiments.

It is further envisioned that the fastening mechanisms 44 may comprise hook and loop, such as Velcro®; button-snap assembly, etc. that may be removably coupleable to an object, such as a chair, stool, etc., according to various embodiments.

It is even further envisioned that the second compressible padding material 24 may be disposed in the aperture 20 anywhere in the first compressible padding material 22 with departing from the intended purpose of the invention, according to alternative embodiments.

It is expected that there could be numerous variations of the design of this invention. An example is that the pad may vary in size, shape, design, thickness, color, texture, etc, according to various embodiments of the present invention.

Finally, it is envisioned that the components of the device may be constructed of a variety of materials, such as fleece, fabric, foam, polyester, nylon, polymer, and other synthetic materials.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A multi-purpose textured pad for providing comfort and entertainment to a user, comprising:
   a first flexible planar member;
   a second flexible planar member substantially coupled to the first planar member at a plurality of edges;
   a first compressible padding material disposed in an interior formed between a bottom side of the first flexible planar member and a top side of the second flexible planar member and configured to support a portion of the user's body;
   an array of elongated texture devices, disposed in a layer above the top surface of the first flexible planar member wherein each texture device includes:
      a plurality of elongated texture members, each including:
         an elongated base member medially coupled to, and extending along the first flexible planar member; and
         a plurality of flexible strips extending outwardly from, and substantially orthogonal to the base member, wherein the plurality of flexible strips are medially coupled to the top surface of the first planar member in an array and configured to provide density and thickness to soften the top surface of the first flexible planar member.

2. The multi-purpose textured pad of claim 1, further comprising:
   a plurality of flexible fastening members medially coupled to the first planar member and second planar member, forming two pairs of fastening mechanisms at an edge of the first planar member and second planar member; and configured to secure the first planar member and second planar member in a folded mode.

3. The multi-purpose textured pad of claim 1, wherein the first flexible planar member and the second flexible planar member comprise a substantially soft fleece material.

4. The multi-purpose textured pad of claim 1, wherein the first compressible padding material comprises a foam pad.

5. The multi-purpose textured pad of claim 1, wherein the elongated texture devices comprise a substantially soft fleece material.

6. The multi-purpose textured pad of claim 2, wherein the two pairs of fastening mechanisms comprise a substantially soft fleece material.

7. A multi-purpose textured pad, consisting essentially of:
   a first flexible planar member;
   a second flexible planar member substantially coupled to the first planar member at a plurality of edges;
   a first compressible padding material disposed in an interior formed between a bottom side of the first flexible planar member and a top side of the second flexible planar member, and configured to provide support to a portion of a user's body;
   an array of elongated texture devices, disposed in a layer above the top surface of the first flexible planar member wherein each texture device, includes:
      an elongated base member medially coupled to and extending along the first flexible planar member; and
      a plurality of flexible strips extending outwardly from, and substantially orthogonal to the base member, wherein the plurality of flexible strips are medially coupled to a top surface of the first planar member in an array and configured to provide density and thickness to soften the top surface of the first flexible planar member.

8. The multi-purpose textured pad of claim 7, wherein the first flexible planar member and the second flexible planar member comprise a substantially soft fleece material.

9. The multi-purpose textured pad of claim 7, wherein the first compressible padding material comprises a foam pad.

10. The multi-purpose textured pad of claim 7, wherein the elongated texture devices comprise a substantially soft fleece material.

11. The multi-purpose textured pad of claim 7, further comprises a plurality of flexible fastening members medially coupled to the first planar member and second planar member, forming two pairs of fastening mechanisms at an edge of the first planar member and second planar member; and configured to secure the first planar member and second planar member in a folded mode wherein the two pairs of fastening mechanisms comprise a substantially soft fleece material.

* * * * *